United States Patent [19]

Garland

[11] 4,417,134

[45] Nov. 22, 1983

[54] MECHANICAL FUEL PUMP COMPUTER CONVERSION MECHANISM

[75] Inventor: Ronald M. Garland, Reigate, England

[73] Assignee: Veeder Industries Inc., Hartford, Conn.

[21] Appl. No.: 360,395

[22] Filed: Mar. 22, 1982

[51] Int. Cl.[3] .......................... B67D 5/22; F16H 3/22; G06C 15/04

[52] U.S. Cl. ............................... 235/61 L; 235/61 M; 235/94 A; 74/348

[58] Field of Search ................ 235/61 L, 61 M, 94 R, 235/94 A; 74/340, 348, 68

[56] References Cited

U.S. PATENT DOCUMENTS 2,814,444 11/1957 Bliss .................................. 235/94 R 4,136,573 1/1979 Suilgy et al. .......................... 74/348

4,292,506 9/1981 Devawney ........................ 235/61 L

*Primary Examiner*—Benjamin R. Fuller

*Attorney, Agent, or Firm*—Prutzman, Kalb, Chilton & Alix

[57] ABSTRACT

A conversion mechanism for selective conversion of a conventional mechanical fuel pump computer to selectively extend the unit volume price range of the computer while maintaining the rotational speed of the right hand cost counter wheels of the computer within acceptable limits. The conversion mechanism comprises a cost drive ratio selector mechanism and one or more sets of substitute single transfer and double transfer right hand cost counter wheels and provides for selectively and successively shifting the decimal point of the unit volume price range and cost counter readout and for establishing a cost counter drive ratio for each of the substitute right hand cost counter wheels.

21 Claims, 9 Drawing Figures

MECHANICAL FUEL PUMP COMPUTER CONVERSION MECHANISM

DESCRIPTION

1. Technical Field

The present invention relates generally to mechanical fuel pump computers of the type employed in fuel dispensing apparatus for computing and registering the volume and cost amounts of fuel delivered and relates more particularly to conversion of such mechanical computers to extend their practical utility for higher fuel prices in the U.S.A., U.K. and other countries.

2. Background

The conventional mechanical fuel pump computer incorporates a mechanical register having a pair of counters on each of two opposite faces of the register (with each counter having a bank of four or five coaxial rotary number wheels) for registering on each of the opposite faces of the register, the cost and volume amounts of fuel dispensed. Such a mechanical register is shown and described in U.S. Pat. No. 2,814,444 of Harvey N. Bliss, dated Nov. 26, 1957 and entitled "Register".

The conventional mechanical fuel pump computer also incorporates a mechanical variator for establishing and posting the unit volume price of fuel. Such a mechanical variator is disclosed in U.S. Pat. No. 4,136,573 of Bruno S. Smilgys et al, dated Jan. 30, 1979 and entitled "Extended Range Variator Conversion Mechanism". The variator disclosed in U.S. Pat. No. 4,136,573 provides for establishing and posting a unit volume price within a four place range of 0000 to 2999, and in a modified form of that variator disclosed in a pending U.S. patent application Ser. No. 259,708 of Raymond H. Devanney, filed May 1, 1981 and entitled "Extended Range Variator Conversion Mechanism", the variator is operable for establishing and posting a unit volume price within an extended four place range of 0000 to 5999.

In the conventional mechanical computer installation, the mechanical computer is mechanically driven by a suitable fuel meter for registering the volume amount of fuel delivered (conventionally in gallons in the U.S.A. and in liters in the U.K.) and the cost amount of fuel delivered in accordance with the volume amount delivered and the unit volume price established by the variator setting. In such an installation, the mechanical computer will normally have a long, maintenance free useful life if the rotational speeds of the computer parts are held within acceptable limits. The recommended maximum operating speed of the mechanical computer is usually given as a recommended maximum operating speed of the right hand or lowest order number wheels of the computer. Such a maximum operating speed is preferably about 150 revolutions per minute (rpm) but may be established as high as 200 or even 250 rpm. In any event, the mechanical computer is preferably operated at the lowest practical speed to extend its useful life.

The normal maximum fuel delivery rate of a conventional fuel dispenser is typically approximately 15 gallons per minute in the U.S.A. and 50 liters per minute in the U.K. Also, in the conventional mechanical fuel dispenser computer the right hand number wheels of both the cost and volume counters of the computer are single transfer, 10 value wheels marked 0–9 for recording a value of ten for each revolution. Thus, with a maximum right hand number wheel speed of 150 rpm and 10 value right hand number wheels, the maximum cost rate of delivery is $15.00 a minute in the U.S.A. (where the right hand cost counter wheel is used to register the cents amount of fuel dispensed) and the maximum gallon unit volume price is $1.00 (i.e. $15.00/minute÷15 gallons/minute). In the United Kingdom, with the right hand cost counter wheels used to register the pence amount of fuel dispensed and a maximum fuel delivery rate of 50 liters per minute, the maximum unit volume price is 30 pence per liter with a maximum wheel speed of 150 rpm.

In the U.S.A. and U.K. and in other countries using other currencies and having an inflation rate which is often higher than that in the U.S.A. and U.K., the speed of the right hand cost counter wheels has been reduced by increasing their value. For example, conversion of the mechanical computer to replace the conventional 10 value right hand cost counter wheels with 20 value wheels enables the cost counter drive ratio to be reduced by a factor of two and provides a cost indicating rate of 3,000 per minute, thereby permitting for example a maximum unit volume price of 60 pence per liter in the U.K. and $2.00 a gallon in the U.S.A. without exceeding a right hand number wheel speed of 150 rpm.

Because of the escalating unit volume price of fuel and the resulting increasing rate of rotation of the right hand number wheels of the register cost counters for any given maximum volume rate of fuel dispensed, the conventional 10 value or single transfer right hand cost counter wheel has in some instances been replaced by a multiple transfer wheel (e.g. a 20 value or double transfer wheel or a 40 value or four transfer wheel) or by a 100 value, single transfer wheel to reduce the rate of rotation, required driven torque and rate of wear of the cost counters. When the value of the right hand cost counter wheels are changed, for example by substituting 20 value, double transfer wheels for 10 value, single transfer wheels, modification of the drive train to the mechanical cost counters is required so that the rate of rotation of the right hand cost counter wheels is reduced by the same factor that it is increased in value. As a result, for any given unit volume price setting of the variator, the right hand cost counter wheels accumulate the cost amount of fuel dispensed at the same cost rate but at a lower rotational speed.

In order to overcome the money wheel speed problem in any particular country, the rotational speed of the right hand cost counter wheels can be reduced as described above where that is a practical solution within the constraints imposed by the pricing requirements and practices of that country. Thus, it may become necessary or desirable to change the right hand cost counter wheels and cost counter drive ratio to reduce the number wheel operating speed by one factor in one country and by a different factor in a different country. Also, it may be necessary or desirable to effect such changes at different times in different countries and to timely effect a succession of such changes in each particular country as the price of fuel escalates in that country and/or as the value of the local currency is reduced by inflation.

Also, from a manufacturing and repair standpoint, it is highly desirable to use the same mechanical computer configuration throughout the world and without structural modification of the computer. Such flexibility is difficult to achieve particularly because of varying local requirements, standards and practices regarding the unit volume measure to be used and the least significant digit to which the unit volume price in the local currency is to be set, posted and registered by the mechanical computer. For example, in the U.S.A., the gallon is the standard unit volume on which gasoline is priced and gasoline continues to be priced to the nearest one-tenth cent even to where fuel is now priced to four places to the nearest one-tenth cent. Also, in most countries, the oil companies continue to prefer to price fuel to the smallest possible increment primarily for purposes of price competition.

There is no real problem in replacing the right hand cost counter wheels (e.g. to substitute a 20 value, double transfer wheel for a 10 value, single transfer wheel) since such wheel replacement can be done without removing the computer from the pump and therefore at a relatively low cost. However, in the conventional mechanical computer, it is expensive to change the cost counter drive ratio when the cost counter wheels are replaced as such typically requires removing the computer from the pump and separating the register from the variator to modify the counter drive train gearing.

DISCLOSURE OF INVENTION

Accordingly, it is a principal object of the present invention to provide in a mechanical fuel pump computer a new and improved drive ratio conversion mechanism which is both accessible and convenient to operate to convert the computer to a different cost counter drive ratio. In accordance with the preferred embodiment of the present invention, at least three cost counter drive ratios are provided which may be readily individually selected without dismantling the computer and adding gears or other parts.

It is another object of the present invention to provide easily accessible conversion gearing in the register of the mechanical computer to enable the cost counter drive ratio to be reduced as the unit volume price of fuel increases and thereby to make the computer virtually inflation-proof without requiring the computer to be periodically removed from the pump for modification.

In accordance with a further object of the present invention, a fuel pump register conversion mechanism is provided by adapting the mechanical computer to varying world currencies and varying world pricing practices and requirements, including those in the U.S.A., U.K. and many other countries of the world.

It is another object of the present invention to provide drive ratio conversion gearing in the register of a mechanical fuel pump computer for maintaining for the foreseeable future the practical utility of the mechanical computer in the U.S.A., U.K. and other countries as the cost of fuel escalates.

Other objects will be in part obvious and in part pointed out more in detail hereinafter.

A better understanding of the invention will be obtained from the following detailed description and the accompanying drawings of an illustrative application of the invention.

DESCRIPTION OF THE PREFERRED EMBODIMENT

Figure 1:
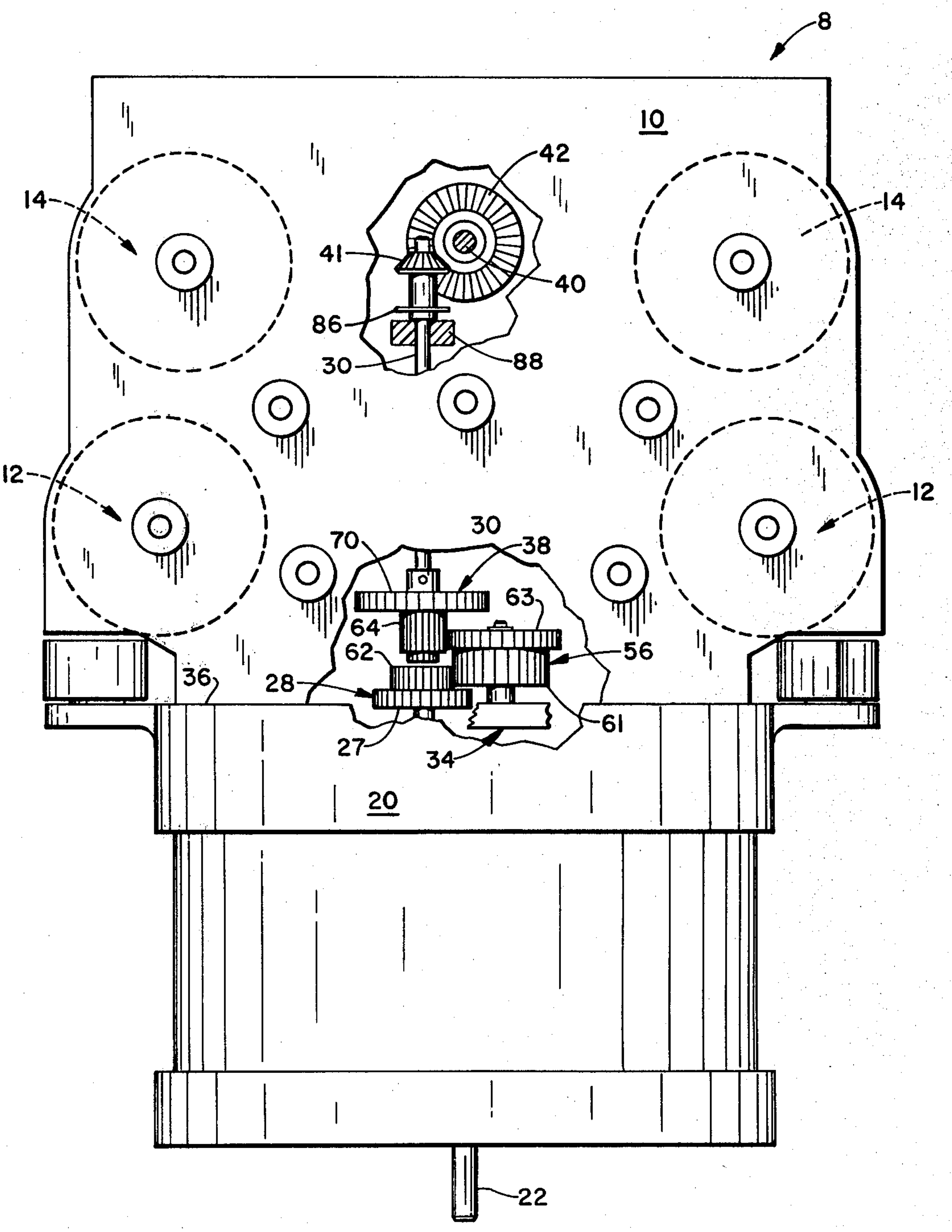
FIG. 1 is a side elevation view, partly broken away and partly in section, of a mechanical fuel pump computer incorporating an embodiment of a computer conversion mechanism of the present invention.

Referring now to the drawings in detail wherein like reference numerals indicate like parts throughout the several figures, there is shown a mechanical fuel pump computer 8 having a mechanical register 10 and a mechanical variator or change speed mechanism 20. The register 10 has a pair of volume and cost counters 12, 14 on each of two opposite faces of the register (with each counter having a bank of four coaxial rotary number wheels) for registering on each of the opposite faces of the register, the cost and volume amounts of fuel dispensed. The register 10 may be substantially identical to a conventional register of the type disclosed in the aforementioned U.S. Pat. No. 2,814,444 except as described hereinafter.

The variator or change speed mechanism 20 provides for establishing and posting a unit volume price of gasoline within a four place unit volume price range. The variator 20 may be substantially identical to a conventional variator of the type shown and described in the aforementioned U.S. Pat. No. 4,136,573 (or as shown and described in the aforementioned U.S. patent application Ser. No. 259,708) except as described hereinafter and therefore will not be described in detail herein. Briefly, however, the variator 20 comprises a center drive shaft 22 which is suitably connected to be rotated by a conventional fuel meter (not shown) of a gasoline dispenser (not shown) in accordance with the volume amount of gasoline dispensed. In the conventional mechanical fuel pump computer installation, the variator center shaft 22 is typically rotated at a rate of four revolutions for each gallon of fuel dispensed where, as is conventional in the U.S.A., the unit volume price is based on a gallon unit volume. Where the unit volume price is based on a liter unit volume, as is conventional in the U.K., the variator center shaft is normally rotated at a rate of two revolutions for each liter of fuel dispensed.

The variator 20 has a price selector mechanism (not shown) adapted to be selectively set for establishing any four place unit volume price within a range of 0000 to 2999 inclusively as shown in the aforementioned U.S. Pat. No. 4,136,573 or within a range of 0000 to 5999 inclusively as shown in the aforementioned U.S. patent application Ser. No. 259,708.

A cost output gear 26 of the variator 20 is rotatably mounted on the variator center shaft 22 and is driven in accordance with the volume amount of fuel dispensed and the unit volume price established by the variator setting. The cost output spur gear 26 intermeshes with a spur gear 27 of a cost input compound gear 28 of the register 10 which is rotably mounted on the lower end of a vertical cost shaft 30 of the register 10. In accordance with the present invention, a three-position decimal point shift lever 34, hereinafter described in greater detail, of a cost drive ratio selector mechanism 35 is pivotally mounted on the variator top plate 36 to selectively connect the cost input compound gear 28 to a second compound gear 38 which is fixed to the vertical cost shaft 30. The vertical cost shaft 30 drives a horizontal or cross cost shaft 40 by means of a pair of intermeshing bevel gears 41, 42. The horizontal cost shaft 40 is connected in a conventional manner to rotate the pair of opposed cost counters 14 of the register 10 for registering the cost amount of gasoline dispensed in accordance with the volume amount of gasoline dispensed and the four place unit volume price established by the variator setting.

A volume output bevel gear 44 of the variator is secured to the upper end of the variator center shaft 22 and engages a volume input bevel gear 46 of the register 10 secured onto a horizontal or cross volume shaft 48 of the register 10. The horizontal volume shaft 48 is connected in a conventional manner for rotating the pair of opposed volume counters 12 of the register 10 for registering the volume amount of gasoline dispensed.

The three-position decimal point shift lever 34 has a first pivotal operating position at which a first "low" speed drive ratio compound gear 54 engages the vertical cost shaft gears 28, 38 to drive the vertical cost shaft at a first "low" drive ratio. The shift lever 34 is mounted to be pivoted from its first operating position to a second operating position at which a second "high" speed drive ratio compound gear 56 engages the vertical cost shaft gears 28, 38 to drive the vertical cost shaft at a second "high" drive ratio which is ten times the "low" drive ratio. Specifically, the "low" and "high" gear ratios provided by the compound gears 54, 56 are 1:5 and 2:1 respectively.

More particularly, the "high" speed compound gear 56 has (a) a lower 20-tooth gear 61 engageable with an upper 13-tooth gear 62 of the lower compound gear 28 and (b) an upper 40-tooth gear 63 engageable with a lower 13-tooth gear 64 of the upper compound gear 38 to provide a 2:1 drive or gear ratio. The "low" speed compound gear 54 has (a) a lower 25-tooth gear 66 engageable with the 13-tooth gear 62 and (b) an upper 15-tooth gear 68 engageable with an upper 39-tooth gear 70 of the compound gear 38 to provide a 1:5 drive or gear ratio.

The selector lever 34 has an arm 172 with an outer end 173 extending beyond the register side plate to provide for manually setting the lever 34 in each of its operating positions. A pair of angularly spaced openings 174 are provided in the outer end 173 of the lever 34 for receiving a set screw 175, and threaded apertures 176 are provided in the variator top plate 36 for selectively locating the lever in its "low" and "high" speed drive positions and also in an intermediate position in which the compound gears 54, 56 are out of engagement with the compound gears 28, 38.

The selector lever 34 is mounted directly on top of the variator 20. For that purpose, the selector lever 34 has a partially cylindrical opening 180 for receiving a partially cylindrical step 182 of an integral variator top plate projection 183. Accordingly, the selector lever 34 is adapted to be placed on the cylindrical step 182 of the variator top plate 36 and pivotally positioned to be held in each of its three operating positions by the set screw 175. Thus, the variator 20 is simply modified to accommodate the selector lever 34 by the provision of the threaded apertures 176 in the variator top plate 36. Also the conversion mechanism of the present invention employs a modified vertical cost shaft assembly 85 in the register 10 which comprises the vertical cost shaft 30, the two compound gears 28, 38 at the lower end of the vertical shaft 30, the bevel gear 41 at the upper end of the vertical shaft 30 and a removable pin or clip 86 for selectively securing the upper bevel gear 41 to the vertical shaft 30.

The vertical cost shaft assembly 85 is rotatably supported on the register frame by a pair of integral shaft support stanchions 87,88 in a conventional manner. The vertical cost shaft 30 is vertically or axially supported by the engagement of the upper bevel gear 41 with the upper stanchion 88.

Figure 2:
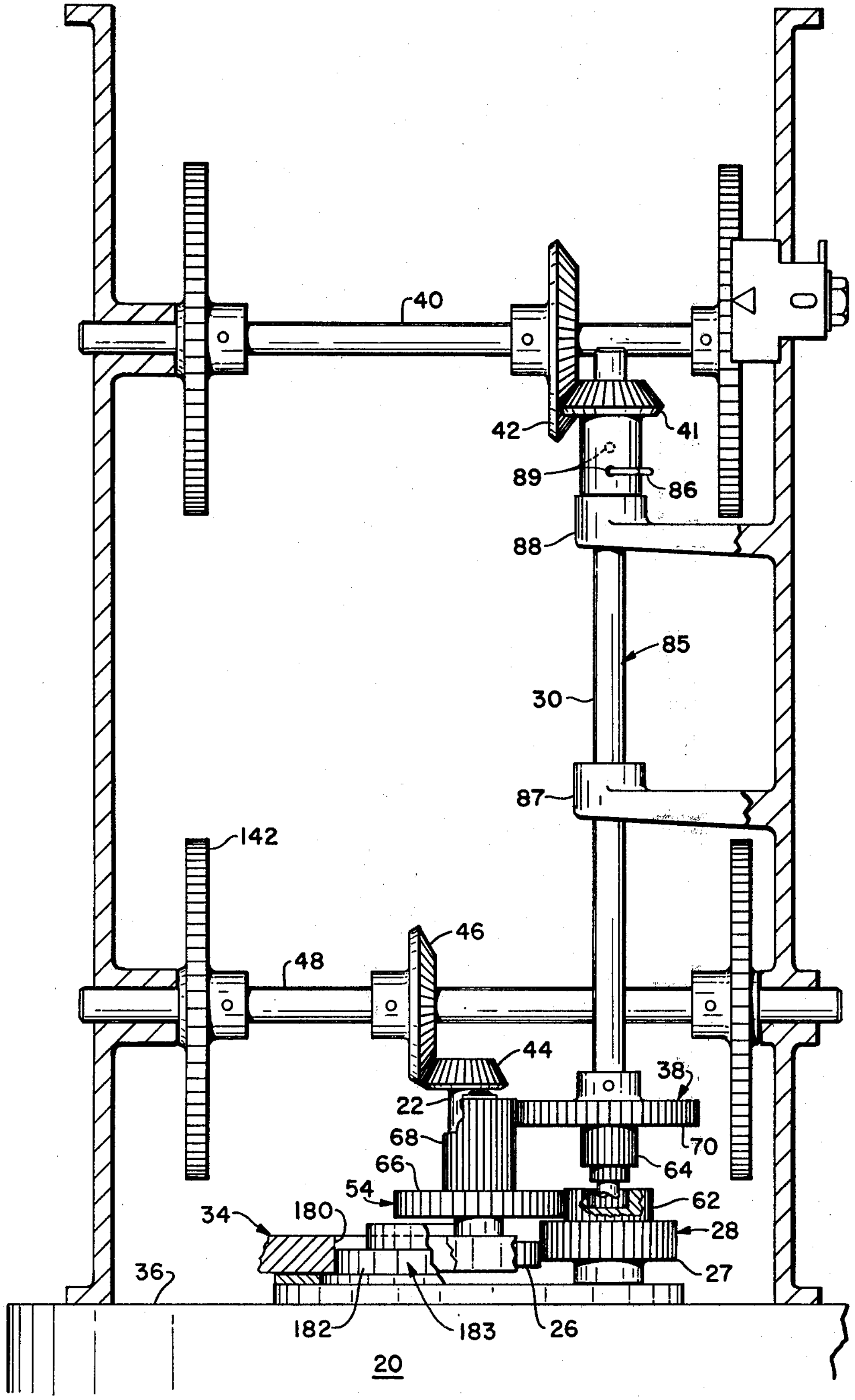
FIG. 2 is an enlarged partial front elevation section view, partly broken away and partly in section, of the fuel pump computer.
Figure 3:
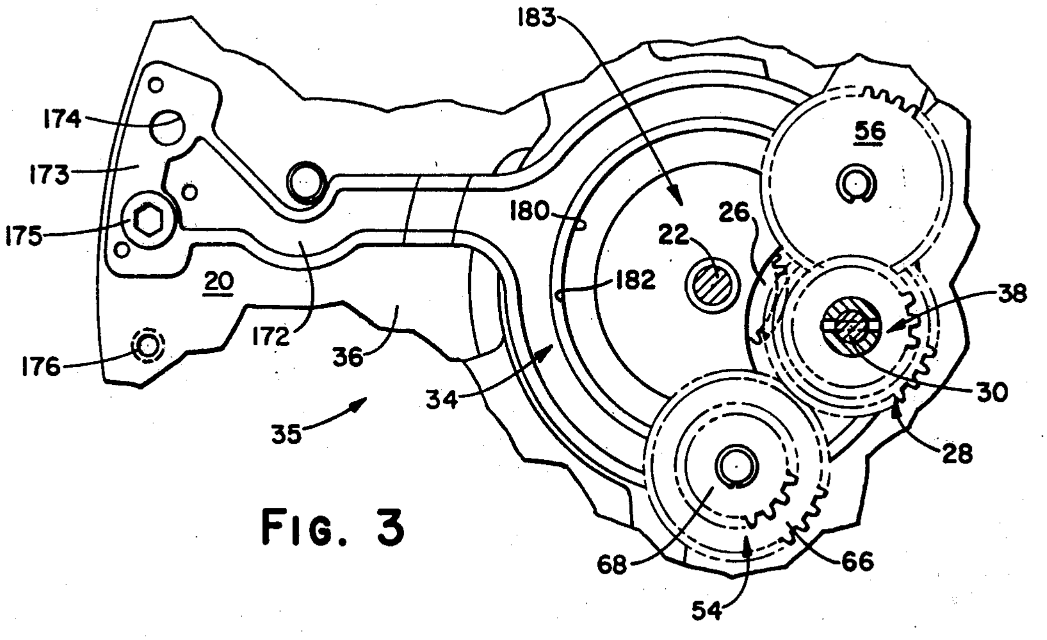
FIG. 3 is an enlarged top plan section view, partly broken away and partly in section, of the fuel pump computer showing the conversion mechanism in greater detail.

The vertical shaft 30 has a pair of axially spaced transverse apertures 89 for receiving the pin or clip 86. Accordingly, the shaft 30 and compound gear 38 affixed to the lower end of the shaft 30 can be axially set at an upper position shown in FIG. 2 with the two lower compound gears 28, 38 in close but axially spaced relationship. Alternatively, the shaft 30 and compound gear 38 can be set at a lower position to interlock or secure the two lower compound gears 28, 38 together. For that purpose, the lower compound gear 28 has a splined pocket for receiving a lower splined extension of the upper compound gear 38. Thus, in the lower setting of the vertical cost shaft 30, the lower compound gear 28 is directly coupled to the upper compound gear 38 to provide a direct or 1:1 drive between the compound gear 28 and shaft 30. Accordingly, such a direct or 1:1 drive ratio setting can be selected by setting the selector lever 34 in its intermediate disengaged position and setting the vertical cost shaft 30 in its lower position.

As previously indicated, in some countries the center shaft 22 is rotated at one-half the conventional U.S.A. rate and therefore two revolutions for each unit volume of fuel dispensed on which the unit volume price is based. In that event, the variator center shaft 22 and variator gearing are rotated at one-half the normal rate to redue the wear and required drive torque for driving the variator. Accordingly, the cost and volume output gears 26, 44 of the variator and the cost and volume input gears 27, 46 of the register are suitably modified to double their drive ratio to offset the variator input drive at one-half rate.

Figure 4:
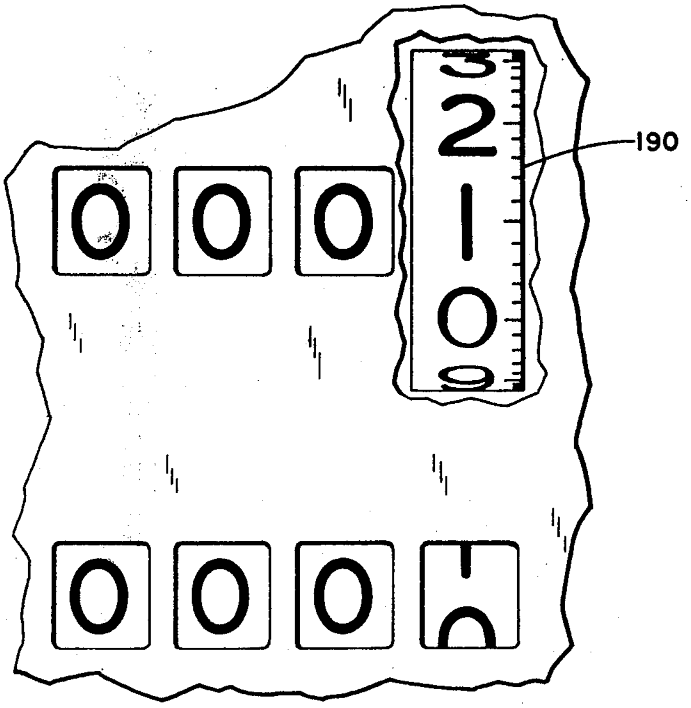
FIG. 4 is an enlarged partial front elevation view of the computer, partly broken away, showing cost and volume counters of the computer, with 10 value, single transfer right hand number wheels.
Figure 5:
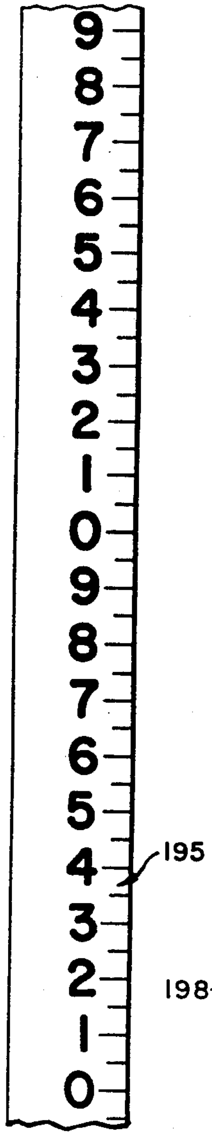
FIGS. 5–9 are enlarged views showing substitute right hand number wheels for the cost counter.
Figure 6:
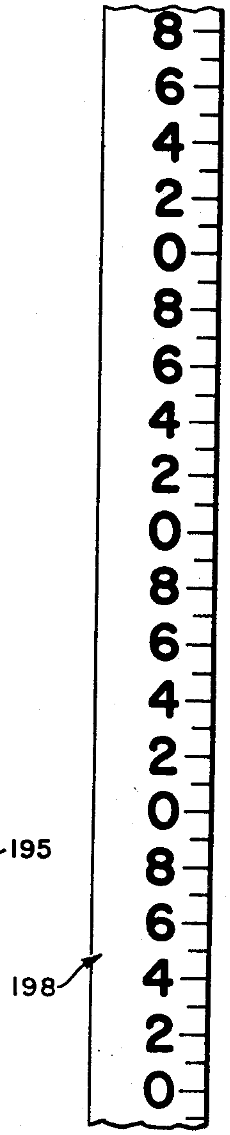
Figure 7:
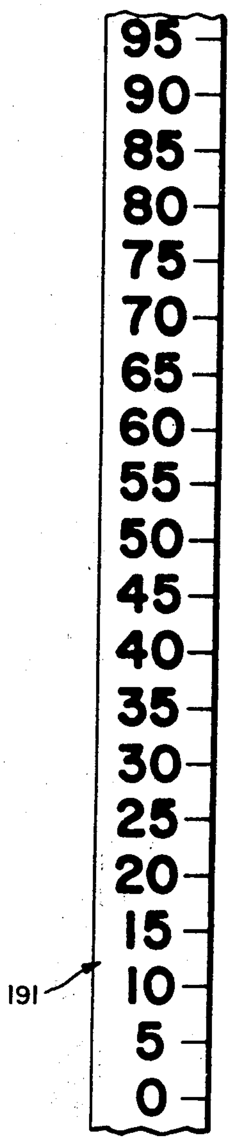
Figure 8:
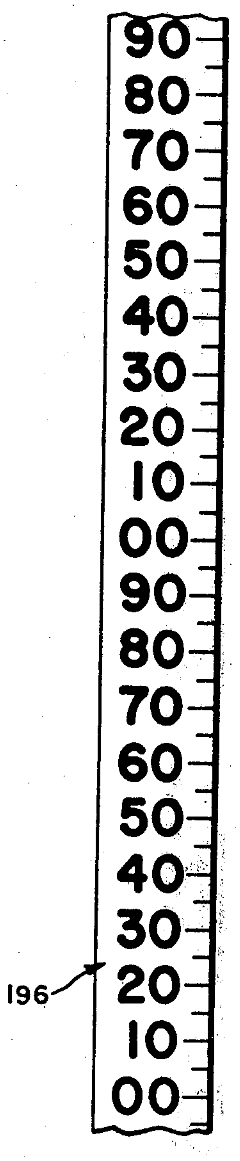
Figure 9:
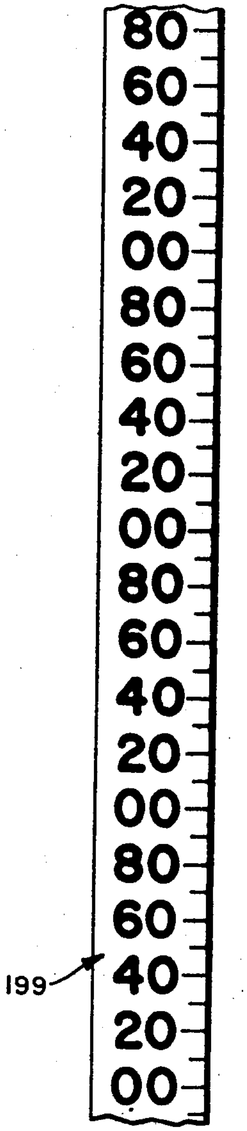

The "high" drive ratio is initially used, for example in the U.S.A. with 10 value, single transfer right hand cost counter wheels 190 (FIG. 4) and a price range which provides for pricing fuel to the nearest 1/10 cent in a conventional manner. The "low" drive ratio is then useful with substitute 100 value right hand cost counter wheels 191 (FIG. 7) (i.e. in effect to shift the decimal point of the cost counter wheels one place to the right) without changing the unit volume price range. Then the "high" drive ratio can be reselected without changing the right hand cost counter wheels to shift the unit volume price decimal point one place to the right, for example in the U.S.A. for pricing fuel to the nearest one cent. The cost counter decimal point and price range decimal point can thereby be successively alternately shifted to the right with the decimal point shift lever 34 as the price of fuel escalates and/or as the value of the applicable currency diminishes due to inflation.

The variator unit volume price range can thereby be selectively increased by a factor of ten, for example in the U.S.A. to increase the maximum available unit volume price setting from $2.999 or $5.999 to $29.99 or $59.99 respectively. In conjunction with such a price range increase, the three-position decimal point shift lever 34 can be set for using 10 value, 100 value or even 1000 value single transfer right hand numeral wheels and provide a variator price range in accordance with the currency and unit volume measure with which the computer is used.

Also, as described, the cost drive ratio selector mechanism 35 provides for selecting a third "intermediate" gear or drive ratio to the cost counters 14. In the shown example, the cost drive ratio selector mechanism 34 provides for additionally selecting a direct drive or 1:1 drive ratio between the compound gear 28 and the vertical cost shaft 30. The three available drive ratios provided by the cost drive ratio selector mechanism 35 therefore provide three relative gear or speed ratios of 1, ½ and 1/10 respectively.

The 2:1 gear ratio is the basic gear ratio for use with 10 value, 100 value or 1000 value, single transfer right hand cost counter wheels. The 1:1 gear ratio provides for driving the right hand cost counter wheels at one half the speed of the basic gear ratio and is used with 20 value and 200 value, double transfer, right hand money wheels 195, 196 respectively or even 2000 value, double transfer, right hand money wheels (not shown). The 1:5 gear ratio provides for driving the right hand cost counter wheels at one-tenth the speed of the basic gear ratio and is used as described to shift the decimal point to the right in the cost counter readout. For example, in the U.S.A. the 10 and 20 value right hand money wheels 190, 195 respectively may be initially used with a unit volume price range of $2.999 or $5.999. The 100 value right hand money wheels 191 are then used with the $2.999 or $5.999 price range. The price range is then increased by a factor of ten to $29.99 or $59.99 with the decimal point shift lever 34. The 200 value right hand money wheels 96 are then used with the higher unit volume price range setting of $2.999 or $5.999.

Accordingly, the cost drive ratio selector mechanism 35 provides for either a standard drive ratio to the cost counters (with the 2:1 gear ratio) or selectively reducing the drive ratio by a factor of two (2) or ten (10). The one-half speed reduction is used with substitute 20, 200 and even 2000 value right hand cost counter wheels, and the one-tenth speed reduction is used for shifting the decimal point in the cost counter readout. With a 20, 200 or 2000 value wheel and a one-half speed reduction, the established unit volume price of the mechanical computer 8 can be doubled without increasing the cost counter speed. Likewise, using a one-tenth speed reduction, the value of the right hand cost counter wheels can be increased by a factor of ten (e.g. from 10 to 100 or from 100 to 1000).

Thus, in the U.S.A. the gear ratios of the computer provide for using 10 and 20 value right hand money wheels 190,195 respectively, as long as the decimal point selector lever is set to establish a maximum unit volume price of $2.999 or $5.999. The 100 value right hand money wheels 191 are subsequently used in the U.S.A. to reduce the speed of the right hand counter wheels as the unit volume price of fuel increases and the 100 value and 200 value right hand money wheels 191,196 respectively, are then used for registering the cost after the decimal point shift lever 34 is set to establish the $29.99 or $59.99 price range. Thus, although a set of 100 and 200 value wheels 191,196 respectively or a set of 10 and 20 value wheels 190,195 respectively, or even a set of 1000 and 2000 value wheels (not shown) may be initially used in any particular country in accordance with the currency and pricing practices of that country, the use of a plurality of sets of numeral wheels along with the cost drive ratio selector mechanism 35 make the mechanical computer 8 essentially inflation proof and continuingly useful even up to a unit volume price of for example in the U.S.A. of $29.99 or $59.99 or even higher.

It will be noted that substitute right hand cost counter wheels are installed when selecting the intermediate direct drive. Also, when shifting to the "low" speed or 1:5 step down drive, substitute right hand cost counter wheels typically are installed to increase the value of the right hand cost counter wheels from 10 (or 20) to 100 or from 100 (or 200) to 1,000. However, when the cost drive ratio selector mechanism 35 is shifted from its "low⇄ speed setting to its "high" speed setting, new or substitute right hand cost counter wheels typically are not installed, and instead the decimal point in the unit volume price is shifted one place to the right.

An exemplary progression of how the mechanical computer can be converted by the cost drive ratio selector mechanism 35 to permit the mechanical computer to accommodate an increasing unit volume price of fuel in the U.S.A. is shown by the following table:

| Drive Ratio Setting | Right Hand Cost Counter Wheel Value | Right Hand Cost Counter Wheel No. Transfers | Available Gallon Price Range Using 5999 Variator | Max. Price Setting @ 150 rpm of R-H Cost Counter Wheel & 15 gal./min. Delivery |
|---|---|---|---|---|
| High (2:1) | $0.10 | 1 | 0 to $5.999 | $1.000 |
| Int. (1:1) | $0.20 | 2 | " | 2.000 |
| Low (1:5) | $1.00 | 1 | " | 5.999 @ 90 rpm (Variator Price Limit) |
| High (2:1) | $1.00 | 1 | 0 to $59.99 | 10.00 |
| Int. (1:1) | $2.00 | 2 | " | 20.00 |
| Low (1:5) | $10.00 | 1 | " | 50.00 @ 150 rpm<br>59.99 @ 180 rpm |

It can be seen from the foregoing discussion and the above table that the cost drive ratio selector mechanism 35 enables the mechanical computer to be set in accordance with the currency and unit volume price range of each country and to be virtually inflation-proof as the unit volume price of fuel escalates due to inflation and/or the diminishing value of the local currency. In addition to setting the cost drive ratio selector mechanism 35, the mechanical computer 8 need only be modified by installing substitute right hand cost counter wheels in place of the existing wheels. Periodic conversion provided by the present invention enables the mechanical computer to be converted in steps while maintaining the maximum rpm of the right hand cost counter wheels within practical limits.

It should be understood that for example, 40 value and 400 value, four transfer, right hand money wheels 198, 199 respectively, and even 4000 value, four transfer, right hand money wheels (not shown), could be provided instead of the 20, 200 and 2000 value right hand money wheels. In that event, the compound gears mounted on the lever 34 and on the lower end of the vertical cost shaft 30 would be suitably modified to provide three gear or speed ratios of 4:1 (high), 1:1

(intermediate) and 2:5 (low) and the spur gears 26 and 27 would be modified to reduce the drive ratio through those gears by one-half.

Accordingly, the mechanical computer which was originally developed as a low cost mechanism for setting the unit volume price of fuel and registering the volume and cost amounts of fuel dispensed is made essentially inflation-proof by the present invention and such that the mechanical computer can continue to be used for the foreseeable future.

As will be apparent to persons skilled in the art, various modifications, adaptations and variations of the foregoing specific disclosure can be made without departing from the teachings of the present invention.

I claim:

1. In a mechanical computer for a fuel dispenser having a price variator with an input volume shaft to be rotated in accordance with the volume amount of fuel dispensed and settable for establishing the unit volume price of fuel, a volume counter rotary drive train rotated by the input volume shaft, at least one rotary volume counter, with a plurality of coaxial number wheels of increasing order of significance, rotated by the volume counter drive train for registering the volume amount of fuel dispensed, a cost counter rotary drive train rotated in accordance with the rotation of the input volume shaft and the unit volume price setting of the price variator, and at least one rotary cost counter, with a plurality of coaxial number wheels of increasing order of significance, rotated by the cost counter drive train for registering the cost amount of fuel dispensed, the improvement wherein the cost counter drive train comprises a cost drive ratio selector mechanism for selectively providing a plurality of different alternative cost counter drive ratios which include two drive ratios which differ by a factor of ten to provide for selectively shifting the decimal point in the unit volume price setting of the price variator and in the cost registration of the cost counter.

2. A mechanical computer for a fuel dispenser according to claim 1 wherein the cost counter drive train comprises a first rotary cost shaft, wherein said rotary cost counter is driven by said first rotary cost shaft and wherein the cost drive ratio selector mechanism comprises a pivotal selector lever pivotal about an axis generally parallel to the axis of said first rotary cost shaft, first and second coaxial gear means rotatably mounted on and secured to said first rotary cost shaft respectively, and third and fourth gear means mounted on the pivotal selector lever to be selectively pivoted thereby into intermeshing engagement with said first and second gears to provide said two different drive ratios.

3. A mechanical computer for a fuel dispenser according to claim 2 wherein the variator has a frame with top and bottom plates and said input volume shaft extends through the top and bottom plates generally normal thereto, wherein the axis of said first rotary cost shaft is parallel to the axis of said input volume shaft of the variator and said first and second coaxial gear means are mounted on said first rotary cost shaft adjacent to the variator top plate, and wherein the pivotal selector lever is pivotally mounted on the top plate of the variator.

4. In a mechanical computer for a fuel dispenser operable for setting the unit volume price and registering the volume and cost amounts of fuel dispensed and having a price variator with an input volume shaft to be rotated in accordance with the volume amount of fuel dispensed and settable for establishing the unit volume price of fuel within a predetermined multiple place unit volume price range, and a rotary cost output rotated in accordance with the rotation of the input volume shaft and the unit volume price setting of the price variator; and a register with a volume counter rotary drive train rotated by said volume shaft of the price variator module, at least one rotary volume counter, with a plurality of coaxial number wheels of increasing order of significance, rotated by the volume counter drive train for registering the volume amount of fuel dispensed, a cost counter rotary drive train rotated by said rotary cost output of the price variator and having a first rotary cost shaft with an axis parallel to the axis of said volume shaft, and at least one rotary cost counter, with a plurality of coaxial number wheels of increasing order of significance, rotated by said first rotary cost shaft for registering the cost amount of fuel dispensed, the improvement wherein the cost counter drive train comprises a cost drive ratio selector mechanism for selectively providing a plurality of different alternative cost counter drive ratios between said rotary cost output of the price variator and said first rotary cost shaft, the cost drive ratio selector mechanism comprising a pivotal selector lever pivotal about an axis generally parallel to the axis of said first rotary cost shaft, first and second coaxial gear means rotatably mounted on and secured to said first rotary cost shaft respectively, and third and fourth gear means mounted on the pivotal selector lever to be selectively pivoted into intermeshing engagement with said first and second gear means to provide two of said different alternative cost counter drive ratios.

5. A mechanical computer for a fuel dispenser according to claim 2, 3, or 4 wherein each of said third and fourth gear means is a compound gear.

6. A mechanical computer for a fuel dispenser according to claim 2, 3 or 4 wherein each of said first and second coaxial gear means is a compound gear.

7. A mechanical computer for a fuel dispenser according to any claim 1 through 4 wherein said cost drive ratio selector mechanism is separately settable to provide first, second and third different alternative cost counter drive ratios.

8. A mechanical computer for a fuel dispenser according to claim 2, 3 or 4 further comprising means for selectively axially shifting said first rotary cost shaft to each of two axial positions thereof respectively providing a 1:1 direct drive ratio from said first gear means to said first rotary cost shaft and different alternative drive ratios via said third and fourth gear means.

9. A mechanical computer for a fuel dispenser according to claim 8 wherein the cost counter drive train comprises a second rotary cost shaft transverse to and rotated by said first rotary cost shaft and connected to rotate the rotary cost counter, first and second intermeshing bevel gears mounted on said first and second rotary cost shafts to rotate said second shaft with said first shaft, and a removable key to selectively key said first bevel gear to said first shaft in said two axial positions of said first shaft.

10. A mechanical computer for a fuel dispenser according to claim 7 wherein said first, second and third different alternative drive ratios provide relative speed ratios of 1, 1/a and 1/10 where a is a whole number greater than 1 and less than 10.

11. A mechanical computer for a fuel dispenser according to claim 10 where a is 2.

12. A mechanical computer for a fuel dispenser according to claim 11 wherein said first, second and third different alternative drive ratios are 2:1, 1:1, and 1:5 respectively.

13. A mechanical computer for a fuel dispenser according to claim 4 wherein said two different cost counter drive ratios differ by a factor of ten to provide for selectively shifting the decimal point in the unit volume price setting of the price variator and in the cost registration of the cost counter.

14. A conversion mechanism for a mechanical computer for a fuel dispenser settable for establishing the unit volume price of fuel and operable for registering the volume and cost amounts of fuel dispensed and having a volume counter rotary drive train to be rotated in accordance with the volume of fuel dispensed, at least one rotary volume counter, with a plurality of coaxial number wheels of increasing order of significance, rotated by the volume counter drive train for registering the volume amount of fuel dispensed, a cost counter rotary drive train with a first rotary cost shaft rotated in accordance with the volume amount of fuel dispensed and the unit volume price setting of the computer, and at least one rotary cost counter, with a plurality of coaxial number wheels of increasing order of significance, rotated by said first rotary cost shaft for registering the cost amount of fuel dispensed, the conversion mechanism comprising a cost drive ratio selector mechanism in the cost counter drive train for selectively providing a plurality of different alternative cost counter drive ratios to said first rotary cost shaft which include two drive ratios which differ by a factor of ten to provide for selectively shifting the decimal point in the unit volume price setting of the computer and in the cost registration of the cost counter.

15. A conversion mechanism for a mechanical computer for a fuel dispenser settable for establishing the unit volume price of fuel and operable for registering the volume and cost amounts of fuel dispensed and having a volume counter rotary drive train to be rotated in accordance with the volume amount of fuel dispensed, at least one rotary volume counter, with a plurality of coaxial number wheels of increasing order of significance, rotated by the volume counter drive train for registering the volume amount of fuel dispensed, a cost counter rotary drive train, with a first rotary cost shaft, rotated in accordance with the volume amount of fuel dispensed and the unit volume price setting of the computer, and at least one rotary cost counter, with a plurality of coaxial number wheels of increasing order of significance, rotated by said first rotary cost shaft for registering the cost amount of fuel dispensed, the conversion mechanism comprising a cost drive ratio selector mechanism in the cost counter drive train for selectively providing a plurality of at least three different alternative cost counter drive ratios and including a decimal point selector mechanism upstream of said first rotary cost shaft for individually selecting two relative drive ratios which differ by a factor of ten.

16. A conversion mechanism for a mechanical computer for a fuel dispenser, according to claim 14 or 15, wherein said plurality of different alternative cost counter drive ratios comprise first, second and third different drive ratios having relative speed ratios of 1, 1/a and 1/10 wherein a is a whole number greater than 1 and less than 10.

17. A conversion mechanism for a mechanical computer for a fuel dispenser, according to claim 16, wherein a is 2.

18. A conversion mechanism for a mechanical computer for a fuel dispenser, according to claim 17, further comprising single transfer and double transfer alternative lowest order cost counter wheels having relative readout values of 10, 100 and 1000 and 20, 200 and 2000 respectively.

19. A conversion mechanism for a mechanical computer for a fuel dispenser, according to claim 14 or 15, further comprising alternative lowest order cost counter wheels having relative readout values which differ by a factor of ten.

20. A conversion mechanism for a mechanical computer for a fuel dispenser, according to claim 14 or 15, wherein the conversion mechanism comprises first and second coaxial gears respectively rotatably mounted on and secured to said first rotary cost shaft, means for selectively keying said first coaxial gear to said first cost shaft to provide one of said plurality of different cost counter drive ratios, third and fourth gears which are compound gears, and means for alternatively selectively mounting the third and fourth gears in engagement with both of said first and second coaxial gears to respectively provide two additional different cost counter drive ratios.

21. A conversion mechanism for a mechanical computer for a fuel dispenser, according to claim 14, wherein the conversion mechanism comprises a decimal point selector mechanism in the cost counter drive train upstream of said first rotary cost shaft having a pivotal selector lever for individually selecting said two relative drive ratios which differ by a factor of ten.

* * * * *